United States Patent [19]
Alexander et al.

[11] Patent Number: 6,131,155
[45] Date of Patent: Oct. 10, 2000

[54] PROGRAMMER-VISIBLE UNCACHED LOAD/STORE UNIT HAVING BURST CAPABILITY

[75] Inventors: Thomas Alexander, Mulino; Lester Noel Stott, Aloha, both of Oreg.

[73] Assignee: PMC Sierra Ltd., BC, Canada

[21] Appl. No.: 09/012,568

[22] Filed: Jan. 23, 1998

Related U.S. Application Data

[60] Provisional application No. 60/064,950, Nov. 7, 1997.
[51] Int. Cl.⁷ .................................................. G06F 9/30
[52] U.S. Cl. ........................................... 712/207; 711/138
[58] Field of Search .................... 712/207, 213; 711/138

[56] References Cited

U.S. PATENT DOCUMENTS 5,613,136  3/1997  Casavant et al. ...................... 395/800

Primary Examiner—John A. Follansbee
Attorney, Agent, or Firm—Burns Doane Swecker & Mathis L.L.P.

[57] ABSTRACT

A standard CPU (with a data cache) is modified in such a way as to permit the programmer to bypass the data cache when necessary in order to fetch or store data items directly from/to the memory, ensuring that data accesses exhibiting a high degree of locality are made to the cache, while those accesses that are non-local, or referencing shared data items, are made directly to the main memory, bypassing the cache. The fundamental observation is that in most situations the programmer of the CPU could very easily determine which data items could benefit from being placed into the data cache and which ones could not. This is especially true in embedded communications environments where the programmer has explicit control over data items that are shared between the program running on the CPU and the remainder of the hardware elements. The performance penalties incurred when the data cache is bypassed are obviated by means to allow the programmer to group accesses to these data items in such a way as to optimize references to main memory.

12 Claims, 3 Drawing Sheets

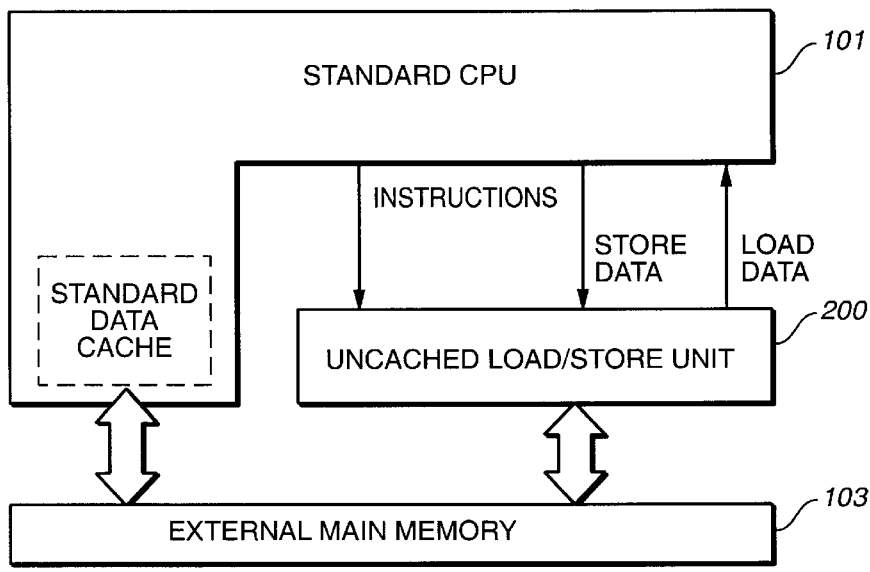
FIG._1
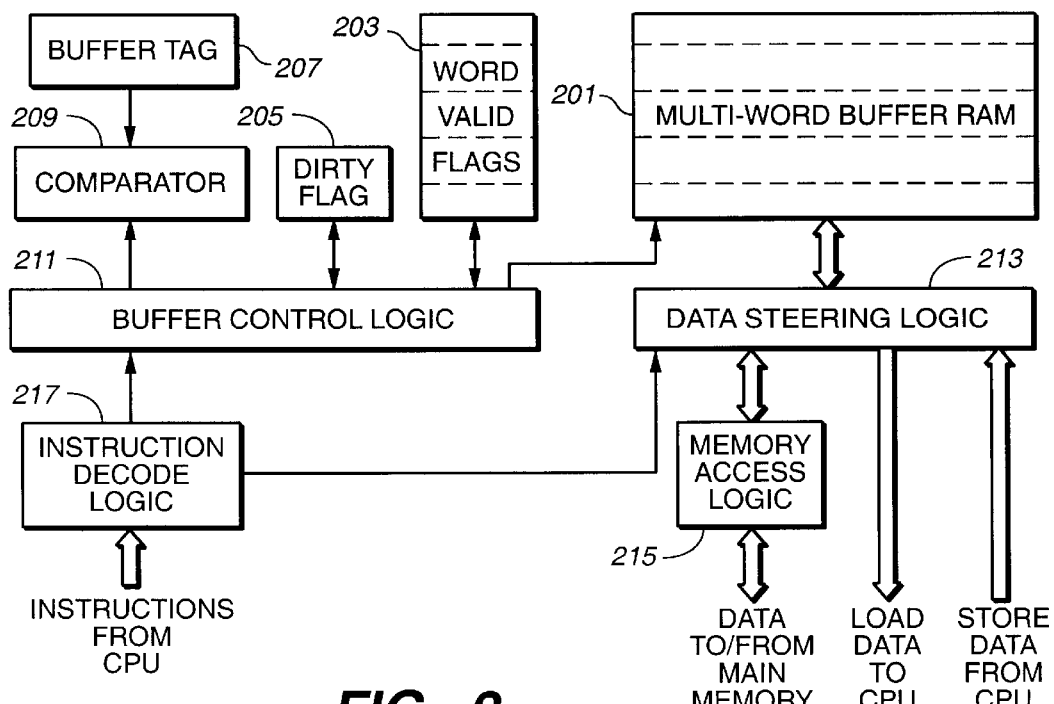
FIG._2
FIG._3

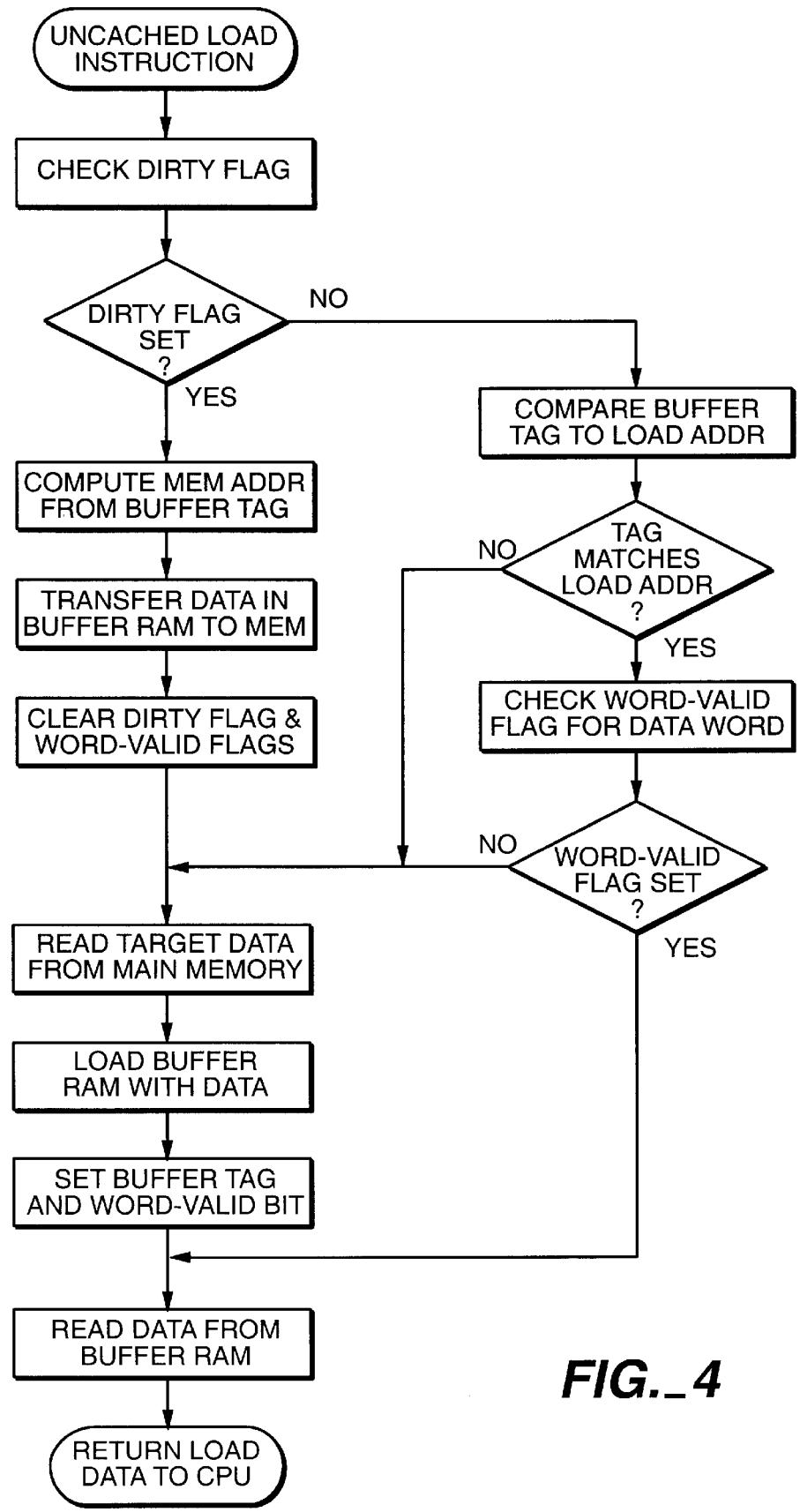
FIG._4

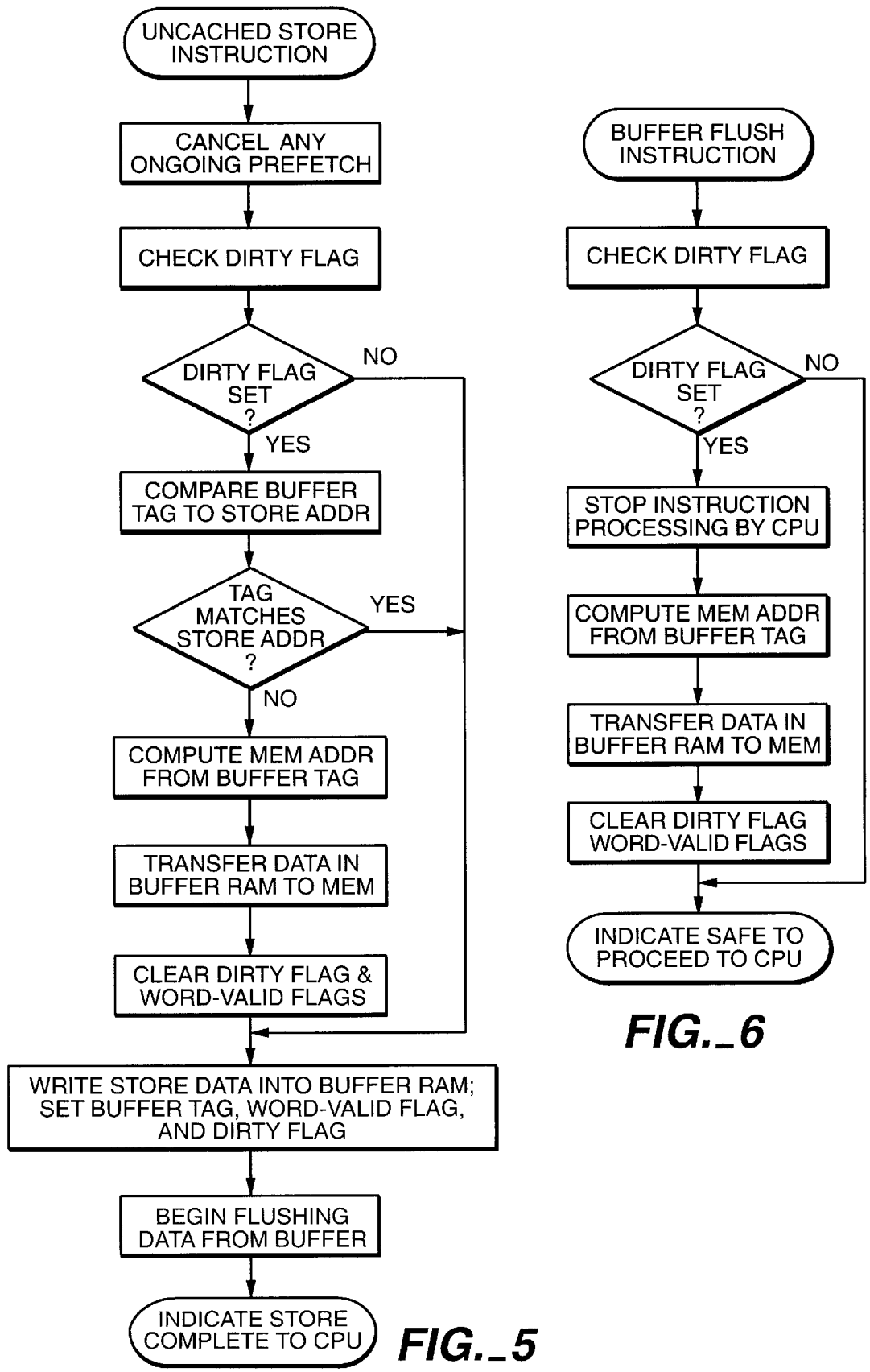
FIG._5
FIG._6

PROGRAMMER-VISIBLE UNCACHED LOAD/STORE UNIT HAVING BURST CAPABILITY

This application claims the benefit of Provisional Application No. 60/064,950 filed Nov. 7, 1997.

BACKGROUND OF THE INVENTION

1. Field of the Invention

The present invention relates to computer architecture, more especially to memory access pattern optimization.

2. State of the Art

Modern high-performance Reduced Instruction Set Computer (RISC) CPUs typically require very high rates of data transfer to and from external memory devices holding program data in order to achieve fast program execution rates. This is because a significant fraction of normal programs consist of memory access (load and store) instructions that transfer data from external memory to internal registers or from internal registers to external memory prior to performing computations; thus, in order to obtain an overall high rate of program execution, it is necessary to make these data transfers as fast as possible.

Modern memory devices are generally capable of relatively high rates of data transfer only when the transfers are conducted in the form of long, uninterrupted "bursts", where data words at consecutive memory locations are read or written in consecutive clock cycles, without any break or gap. This limitation is due to the physical implementation of the memory devices; it is normally very difficult to achieve significantly high data transfer rates to and from memory devices with random accesses to arbitrary memory locations at non-uniform intervals. Instead, most low-cost memories such as dynamic RAMs (DRAMs) offer an operating mode where accesses made to an individual data item will require a relatively long time to complete, but accesses to subsequent data items located at sequentially following memory locations can then be completed quickly, as long as there is no break or gap in performing these additional accesses.

Unfortunately, due to the intrinsic structure of computer programs, it is difficult for traditional CPUs to perform accesses to external memory devices using the long burst transfers previously described. It is typical for programs to generate short, random accesses to various memory locations at nonconsecutive addresses. (An exception to this is the class of programs used in scientific and numerical computing: the input and output data for these programs are naturally structured into regular patterns, such as vectors or matrices, that lend themselves to the burst access patterns favored by memory devices. Other classes of programs, however, notably the complex control functions required in communications devices, do not follow this model.) Such nonconsecutive memory access modes can substantially reduce the data transfer rate possible between the memory and the CPU, and, as a consequence significantly reduce program execution rates. In addition, the path between the CPU and the main memory can be quite long (in terms of time required to traverse the path), and hence random unrelated memory accesses will be performed quite slowly.

The standard method of obviating this problem has been to use a hardware element called a data cache. A cache is a small block of random-access memory that is placed in between the CPU and the main memory that temporarily holds data items that are required by the CPU during program execution. The basic operating principle of a cache is that of locality of reference: this refers to the fact that most programs typically only deal with a small group of data items at a time (even though these elements are accessed in a highly random and unstructured manner), and make repeated accesses to data items in this group. Thus, if by some means these localized accesses are trapped and directed to the cache, then they can be satisfied very rapidly, much more so than if they were sent to the main memory instead. As the cache is quite small, it can be constructed from very fast but expensive memory devices; random accesses by the CPU to the cache are therefore much faster than similar accesses to the main memory. A cache replacement algorithm is used to dynamically adjust the set of data items contained within the cache as the focus of the program execution changes over time. Data items can be brought into the cache in groups, using long burst accesses to the main memory; after they are no longer needed by the CPU, the updated data items can be written back to the main memory, again in long bursts. All of this activity takes place without any intervention by the program, or, indeed, any knowledge by the program or programmer that a cache even exists.

Data caches, however, provide a performance improvement only if the program execution performs repeated accesses over a short period of time to a small group of data items (though these may be distributed over arbitrary items). This behavior is true of general-purpose programs. However, if the program being executed were to exhibit a low locality of reference (i.e., program instructions make reference to each data item only once before moving to the next item), then a data cache would be useless. In fact, under these circumstances a data cache may actually be detrimental to performance, because most data caches typically attempt to transfer data to/from memory in small blocks or cache lines of 4 to 64 data words at a time; if the program were, say, to access only one or two of these data words, then the cache would actually consume more memory bandwidth in transferring the unused data words to/from main memory. This phenomenon is known as cache thrashing, and manifests itself in the form of continuous transfer of data between the cache and the main memory accompanied by a very low rate of program execution. Another problem associated with caches is that of memory consistency. Data items are essentially copied into the cache; thus, for every data item in the cache, there is a corresponding copy in the main memory. If the CPU updates a data item in the cache, the copy in main memory will become out-of-date (or stale); if some external device, such as another CPU or a Direct Memory Access (DMA) controller device, were to access the copy in the main memory, then it would receive stale data, which could result in system failures. On the other hand, always forcing the cache to keep the copies in main memory up-to-date would essentially eliminate the benefits of the cache, as program execution would have to be stopped until the cache could transfer the updated copies to main memory. (An alternative is to have the external device attempt to access both the cache and the main memory, but this is both difficult and costly.)

Unfortunately, many programs used in embedded communications and control applications exhibit poor locality of reference and also suffer from memory consistency problems. As an example consider the case of an Ethernet packet switch controller that contains an embedded CPU for performing control functions as well as a DMA controller for handling data transfers. When an Ethernet packet is to be transmitted by this system, the embedded CPU must inspect and potentially modify the Ethernet packet data in main memory, and then indicate to the DMA controller that the packet data are to be transferred from main memory to the Ethernet physical link. If the CPU contains a cache, then it is very likely that after the CPU has completed modifying the packet the copy of the packet in the main memory will be stale, as the up-to-date copy will be residing in the cache. When the DMA controller transfers data from main memory to the Ethernet physical link, it will read and transfer the wrong (old) data, not the modified packet.

In addition, it is unlikely that the CPU will make more than one access to each of a small number of words of the packet during the modification process. Thus, if the data cache were to read the packet from main memory in the normal manner, there would be considerable wastage of memory bandwidth, as a substantial number of words would be read but only a small number of words would be actually modified by the CPU for each packet being processed. As the Ethernet packet switch is expected to process thousands of such packets per second, with consecutive packets being stored in widely different memory locations, the net loss of efficiency is considerable. A solution that has been used in some specialized CPUs is to dispense with the data cache altogether, and use a queued approach to accessing memory. (This is also referred to as a decoupled access/execute architecture.) In such a system, the CPU is permitted to notify a memory access control unit (that regulates accesses to the main memory) in advance that an access will be made to specific data words. The use of queues within the memory access control unit permits multiple such notifications to be made by the CPU, well in advance of when the data are actually required from the main memory during program execution. The memory access control unit is then responsible for sorting out the requests for memory data, capturing such locality as may exist, and fetching (or storing) the data from the main memory in the most efficient manner possible. The memory access control unit also uses a set of queues to return the data to the CPU, which may then, at some future time, read the data out of these queues. The memory access execute unit, in conjunction with the CPU program, thus eliminates the latency effects incurred by random accesses to the main memory from impacting the program execution. At the same time, it avoids the memory consistency problem by not maintaining data copies indefinitely. In effect, the decoupled access/execute architecture renders the memory access mechanism visible to the programmer of the CPU (who has to cause the advance notifications of memory accesses to be generated by inserting appropriate instructions into the program).

Two problems with the decoupled access/execute architecture exist. The first is the complexity of the scheme: the memory access control unit must be made fairly complex in order to capture locality and improve efficiency. The second is that accesses are being made continuously to memory, as there is no data cache; hence those portions of the program data that are actually accessed repeatedly and with high locality will not be benefited by the significant speed-up available from a cache as local copies are not maintained.

To summarize the problem: in high-speed CPUs, it is necessary to optimize accesses to memory generated by executing load/store instructions, as far as possible in order to preserve processing efficiency. This is traditionally done using a data cache, which takes advantage of locality to improve memory transfer patterns and reduce data traffic. However, the data cache approach suffers from the following defects. 1) Many real-time applications (such as communications, networking, graphics, etc.) do not exhibit the high data locality that is necessary for efficient functioning of a data cache. In fact, data caches may actually decrease performance substantially in networking applications. 2) Data caches are normally transparent to the programmer; thus the programmer has very little control over its functioning, and cannot optimize cache accesses to reduce data traffic when the memory access pattern is known. 3) Networking applications typically require access by the CPU firmware to memories designed for burst transactions (e.g., DRAMs and synchronous memories); it is difficult to optimize for these transactions without programmer intervention.

SUMMARY OF THE INVENTION

This invention obviates the disadvantages of the data cache and the decoupled access/execute architecture in the context of embedded controllers for communications (or other) applications. In particular, the problems incurred with the use of a data cache are eliminated without eliminating the cache itself, and without resorting to the complexity and cost of a decoupled access/execute architecture. The specific problems addressed by the present invention, as a consequence of the data access patterns observed in communications systems, are: 1) speeding up of accesses made in a non-local (but still regular) pattern; 2) taking advantage of the high burst transfer rates available from standard low-cost memories; 3) elimination of the data consistency issue resulting from data items being shared between the embedded CPU and other hardware entities.

The fundamental basis of the invention is the observation that in most situations the programmer of the CPU could very easily determine which data items could benefit from being placed into the data cache and which ones could not. This is especially true in embedded communications environments where the programmer has explicit control over data items that are shared between the program running on the CPU and the remainder of the hardware elements. If, therefore, a standard CPU (with a data cache) is modified in such a way as to permit the programmer to bypass the data cache when necessary in order to fetch or store data items directly from/to the memory, then it becomes possible to ensure that the data accesses exhibiting a high degree of locality are made to the cache, while those accesses that are non-local, or referencing shared data items, are made directly to the main memory, bypassing the cache.

This solution, however, is incomplete. As the accesses made directly to the main memory bypass the cache, they are unable to take advantage of the tendency of the cache to convert numerous single accesses to consecutive memory words into bursts of unbroken reads or writes to the main memory. If these bursts of read or write accesses are not made, then the utilization of the main memory transfer bandwidth will suffer.

The further solution to this part of the problem lies in the observation that even in embedded communications environments it is usual for most data items to consist of multiple consecutive memory words: for example, in the case of Ethernet packet switches that must inspect and possibly modify the header information in Ethernet packets during operation, the Ethernet headers that are accessed occupy between 3 and 4 memory words. A substantial amount of the main memory access efficiency that was lost when the data cache was bypassed can therefore be regained by taking advantage of this fact. Thus, if one or more small blocks of fast RAM are provided to the CPU and placed under explicit control of the programmer, it is possible for the programmer to utilize these blocks of RAM to hold such data items as Ethernet packet headers, and thereby permit burst transfers to be made between the main memory and the small RAM blocks.

Note that these RAM blocks do not equate to a data cache, as they are not intended to (automatically or otherwise) indefinitely hold data in order to capture locality of references, but, instead, to improve the efficiency of transfer between the main memory and the CPU when the data cache is bypassed under program control.

BRIEF DESCRIPTION OF THE DRAWING

The present invention may be further understood from the following description in conjunction with the appended drawing. In the drawing:

FIG. 1 is a block diagram of a CPU coupled to an uncached load/store unit;

FIG. 2 is a block diagram of the uncached load/store unit of FIG. 1;

FIG. 3 is a diagram of an exemplary instruction format for the uncached load/store unit of FIG. 2;

FIG. 4 is a flowchart illustrated execution of an uncached load instruction;

FIG. 5 is a flowchart illustrated execution of an uncached store instruction; and FIG. 6 is a flowchart illustrated execution of a buffer flush instruction.

DETAILED DESCRIPTION OF THE PREFERRED EMBODIMENTS

In accordance with the invention, a standard high-performance CPU equipped with a standard data cache is modified as presently described, so as to achieve the foregoing objectives.

Referring to FIG. 1, a view of a CPU 101 coupled with the uncached load/store unit 200 is shown. A set of special "uncached" load and store instructions are implemented within the CPU. These instructions are supplied by the programmer as part of the standard instruction stream to the CPU, which decodes them and directs them to a special "uncached load/store unit" that actually perform the execution of the uncached load and store instructions. The uncached load and store instructions contain a special "prefetch/buffer" bit that is used by the programmer to control the burst behavior of the uncached loads and stores performed to the main memory. Note that the uncached loads and stores behave in a manner that is virtually identical to the "normal" loads and stores, with the exceptions of the prefetch/buffer bit and the bypassing of the data cache.

The uncached load/store unit contains a multi-word buffer constructed from a small block of highspeed RAM for temporarily holding data returned by the main memory during uncached loads, and for holding data prior to transfer to the main memory during uncached stores. The buffer is provided with a register holding a "tag" that identifies the main memory address of the data item(s) being held within the buffer, as well as registers holding valid flags that indicate whether specific words of the buffer contain valid data or not. In addition, the uncached load/store unit contains logic for decoding Instructions and controlling its operation. A block diagram of the uncached load/store unit is shown in FIG. 2.

The uncached load/store unit consists of the following components:

1. A buffer RAM 201 that contains several data words of information read from the main memory prior to transfer to the CPU, or accepted from the CPU prior to transfer to the main memory. Note that the buffer RAM is expected to hold consecutive data words corresponding to a single data item or data structure, and is not expected to hold the information for multiple data items (in the manner of a data cache).

2. A set of word-valid flag registers 203, one for each word in the buffer RAM, that indicate whether the corresponding data word in the buffer RAM contains valid data or not. If the word-valid flag for a particular data word is set to a logical '1' value, then it may be taken as an indication that the data word in the buffer RAM contains valid data. If none of the word-valid flag registers in the set contain a logical '1' value, then the entire buffer RAM contains no valid data at all; in this case, the buffer RAM is referred to as being "empty".

3. A "dirty" flag register 205, that if the dirty flag is set to a logical '1' value, indicates that the buffer RAM holds information from a preceding uncached store instruction that has not yet been written back to the main memory. If it is set to a logical '0', then it indicates that the data in the buffer RAM (if any) does not need to be written back to main memory.

4. A buffer tag register 207 that holds the main memory address of the first word of the data item that is stored in the buffer RAM, if any. The addresses of the remainder of the words in the buffer RAM may be obtained by adding their offsets from the first word to the contents of the buffer tag register.

5. A tag comparator 209 that compares the contents of the buffer tag register with the memory address generated by an uncached load or store instruction, and returns an indication as to whether the memory data word referenced by an uncached load or store instruction is present in the buffer RAM.

6. Buffer control logic 211 that is responsible for controlling the operation of the various elements of the uncached load/store unit, loading the buffer tag register appropriately, setting and clearing the word-valid flags, and determining how uncached load/store instructions are to be executed.

7. Data steering logic 213 that moves data words between the buffer RAM, the CPU and the main memory in response to commands from the buffer control logic.

8. Memory access logic 215 that permits the uncached load/store unit to perform read and write accesses to the external main memory.

9. Instruction decode logic 217 that accepts uncached load and store instructions from the remainder of the CPU, decodes them, determines the operation to perform, and signals the buffer control logic to carry out the necessary operations. The instruction decode logic is responsible for inspecting the prefetch/buffer bit in the uncached load and store instructions to determine whether to prefetch additional data words into the buffer on loads, or to defer transfer of data words to memory on stores.

FIG. 3 depicts a possible format for the uncached load/store instructions executed. (Note that many other formats and addressing modes are possible; this is given solely for illustrative purposes.)

In FIG. 3, the OPCODE field contains a binary code identifying this instruction as an uncached load or store; the actual operation (whether to load or store) is indicated by the 1-bit L/S field. The P/B field is 1 bit wide, and contains the prefetch/buffer bit already referred to. The REG field indicates the binary code of the CPU register to load to or store from, while the ADDR field gives the information required to compute the target main memory address (such as the absolute address of the data word in main memory, or an offset from a value contained in some designated hardware register).

Referring to FIG. 4, the general operation of the uncached load/store unit will now be described. It should be noted that the uncached load/store unit can only be activated when the CPU encounters an uncached load or store instruction, and hence the following discussion assumes that such instructions have been placed by the programmer into the instruction stream being executed by the CPU.

When an uncached load instruction (with the prefetch/buffer bit cleared to a logical '0') is encountered by the uncached load/store unit, the latter first checks the buffer tag register, the buffer word-valid flags, and the dirty flag to determine how the instruction should be processed, and takes action as follows.

If the dirty flag is set, the buffer RAM has been marked as containing data that must be flushed, or transferred to the main memory, before the uncached load instruction can be processed. In this case, the target memory address of the data to flush out of the buffer RAM is given by the contents of the buffer tag register, and the particular data words to be transferred to memory from the buffer RAM are indicated by the word-valid flags (a logical '1' in a given word-valid flag denotes that the corresponding word in the buffer RAM must be transferred to memory). The uncached load/store unit will then immediately begin transferring the required data words out of the buffer RAM into the target address(es) in main memory, and only proceed with the execution of the uncached load instruction when the transfer has been completed, the dirty flag has been cleared, and all of the buffer word-valid flags have been reset to '0'.

If the contents of the buffer tag register do not match the target memory address of the uncached load instruction, or the buffer word-valid flags are clear, then the buffer RAM does not contain the target data word indicated by the uncached load instruction. In this case, the uncached load/store unit will initiate a transfer from the main memory of the targeted data word; when the data word has been returned by the main memory, it will write the word into the appropriate location within the buffer RAM, set the word-valid bit corresponding to the location to a logical '1' to indicate the presence of valid data, and load the targeted memory address into the buffer tag register, and finally return the data word to the CPU for transfer into the proper internal register. The uncached load is now deemed to have completed.

If the contents of the buffer tag register match the target memory address and the proper word-valid flag is set, then the buffer RAM contains the proper data word indicated by the uncached load instruction. The uncached load/store unit will immediately return the data from the buffer RAM without performing any memory accesses.

When an uncached load instruction with the prefetch/buffer bit set to a logical '1' is processed by the uncached load/store unit, the behavior of the latter is the same as when processing a normal uncached load instruction, but with one significant difference: after the data requested by the uncached load instruction has been passed to the CPU, the uncached load/store unit will continue to read additional data words from consecutive addresses in the main memory and will load them into the buffer RAM until the buffer RAM has been filled. This behavior is referred to as prefetching. All of the data words prefetched from main memory will be requested at once, without a gap or break and hence the main memory will be able to perform a single, unbroken burst transfer of data, achieving a high transfer efficiency. Note that the word-valid bits are set properly to indicate which of the data words in the buffer RAM contain valid prefetched data.

If a subsequent uncached load is performed to an address that is adjacent to the original one, the prefetch process will result in the requested data word being returned immediately from the buffer RAM, without attempting to transfer the data directly from the main memory. The effect is similar to that of a data cache, and the increase in performance and reduction of utilized memory bandwidth is comparable.

It can be seen that the programmer thus has complete control over the access behavior of the uncached load/store unit, and can use it to tune the access pattern used to reference data in main memory, as follows. If a data item consisting of a single word is to be read from the main memory, then the prefetch/buffer bit in the uncached load instruction should not be set by the programmer; in this case, the uncached load/store unit will read precisely one data word from the main memory (unlike a normal data cache, which would have fetched a number of data words, thereby wasting memory bandwidth). On the other hand, if a data item consists of multiple words referenced using multiple consecutive uncached load instructions (each uncached load instruction can only reference a single data word), the programmer can set the prefetch/buffer bit in the first instruction to cause the uncached load/store unit to perform a burst read of all of the desired data into the buffer RAM in a single memory transaction, and the subsequent uncached loads will complete with no delays or unwanted memory accesses.

Note that an extension of the technique described above, which is also covered by this patent application, is to encode within the uncached load instruction the number of data words that must be prefetched by the uncached load/store unit. This will allow the uncached load/store unit to fetch only those data words that are known to be required by the program, as opposed to attempting to fill the buffer RAM every time a prefetch is initiated, thereby further optimizing the use of memory bandwidth.

Referring to FIG. 5, an uncached store instruction with the prefetch/buffer bit clear (set to a logical '0') that is passed to the uncached load/store unit by the CPU is treated in the following fashion. If a prefetch was initiated by a previously issued uncached load instruction (with the prefetch/buffer bit set), then it is canceled, as the issue of the uncached store instruction is treated by the uncached load/store unit as an implicit indication from the programmer that the prefetched data words will not be needed. The dirty flag is then checked. If it is set, the contents of the buffer tag register are compared to the target memory address indicated by the store instruction. If the compare fails, then the buffer RAM contains data (from a previous uncached store) that has not yet been flushed to memory, and must be transferred to memory before attempting to process the current uncached store. The uncached load/store unit will then immediately begin transferring the valid data words (as indicated by the word-valid flags that are set to logical '1's) out of the buffer RAM into the target address(es) in main memory, and only proceed with the execution of the new uncached store instruction when the transfer has been completed, the dirty flag has been cleared, and all of the buffer word-valid flags have been reset to '0'. As before, the target address of a given data word to be written back to memory is obtained by adding the offset of the data word within the buffer RAM to the contents of the buffer tag.

If the dirty flag is not set, or else the contents of the buffer tag match the required uncached store memory address, then it is safe to accept the data to be stored. The uncached load/store unit will then write the store data into the proper location within the buffer RAM, set the corresponding word-valid bit to denote that the buffer RAM contains valid data, set the dirty flag (if it has not already been set) to indicate that the buffer RAM contains data that must be written to the main memory, and finally load the buffer tag register with the proper value (derived from the target memory address) if necessary. The CPU is notified that the store is complete and execution of the rest of the program may proceed.

When the data word supplied by the CPU as a consequence of the uncached store instruction has been written into the buffer RAM, the uncached load/store unit will immediately begin the process of transferring the data in the buffer RAM to the main memory.

The process of transferring the contents of the buffer RAM, after an uncached store instruction has caused data to be written into it, can take some time due to the long latency of transfers to and from the main memory. If additional store instructions are received by the uncached load/store unit during this time, then it will check the target memory addresses against the contents of the buffer tag; if the comparison indicates that the store data can be safely accepted and written into the buffer RAM, the uncached load/store unit will simply add the new data to that already existing in the buffer RAM, set the appropriate word-valid flag(s), and continue to transfer the data in the buffer RAM to the main memory. (If the comparison fails, then the uncached load/store unit will hold off the new store until the original store data has been flushed from the buffer RAM.)

The behavior of the system when it processes an uncached store instruction with the prefetch/buffer bit set to a logical '1' is almost identical to that already described for normal uncached store instructions, but with a significant exception: the buffer RAM is not flushed to the external main memory immediately upon completion of processing for the uncached store. Instead, the data written to the buffer RAM is held until a subsequent event, such as an uncached load, an uncached store with the prefetch/buffer bit set to a logical '0', or an uncached store where the buffer tag comparison fails, causes the data in the buffer RAM to be flushed out to memory.

Note that multiple uncached store instructions with the prefetch/buffer bit set to a logical '1' may be issued before the buffer is finally flushed; the data supplied by all of these instructions is accumulated in the buffer RAM. In this case, it is possible to build up a number of data words destined for consecutive addresses in main memory in the buffer RAM before actually performing the transfer to memory. The uncached load/store unit will, if this occurs, attempt to transfer all the data words present in the buffer RAM to main memory in a single burst transaction, thereby increasing the utilization of the memory bandwidth and reducing transfer time.

This latter behavior of the uncached load/store unit allows a programmer to control the operation of the system when transferring data from the CPU to the main memory. If the programmer determines that a particular data item consists of multiple data words present in adjacent memory locations, then the prefetch/buffer bit may be set to a logical '1' in all but the last of the uncached store instructions used to write the data words to memory. The uncached load/store unit will accept and accumulate the data words being stored until it receives the last store instruction (with the prefetch/buffer bit cleared to a logical '0'); at this point, it will transfer all the accumulated words to memory as a single burst, thereby maximizing memory transfer efficiency. If, on the other hand, the programmer needs to store a single data word to memory, then the prefetch/buffer bit should be set to a logical '0', and the uncached load/store unit will perform the transfer to memory immediately. This is in complete contrast to the operation of a data cache under the same circumstances—the data cache will not only attempt to transfer entire lines to memory regardless of the actual number of data words modified but, in addition, there could exist an indefinite and considerable time delay between the point at which the store instruction is executed and when the main memory transfer is initiated.

It is sometimes necessary for the programmer to guarantee that the data placed in the buffer RAM by an uncached store instruction has actually reached the main memory before continuing with the program (e.g., if it is necessary to notify some hardware device that it is safe to attempt to read the stored data from the main memory). This may be implemented in the form of a special instruction referred to as a Buffer Flush instruction, that tests the dirty flag of the uncached load/store unit.

Referring to FIG. 6, if the dirty flag is set, the Buffer Flush instruction forces the uncached load/store unit to initiate the transfer of the data in the buffer RAM to the main memory, and also prevents the CPU from executing any additional instructions of the program until the transfer is complete and the dirty flag has been cleared. If the dirty flag is clear, the instruction has no effect, as this guarantees that the main memory contains the latest copy of any uncached store data.

It should be noted that the behavior described above assumes a single block of buffer RAM with a single set of word-valid flags, buffer tag and dirty flag associated with it. This implies that uncached loads and stores must be handled by the system serially, i.e., intermixing uncached accesses to multiple disparate data items will cause the uncached load/store unit to constantly shuffle data into and out of the buffer RAM, thereby losing efficiency. The mechanism described, however, is quite simple to extend to multiple blocks of buffer RAM (each block being associated with its own set of word-valid flags, buffer tag and dirty flag). In such an arrangement, the uncached load/store instruction should merely specify the particular buffer RAM to use for any given operation; the programmer can therefore intermix the accesses from multiple uncached loads and stores that are active simultaneously, and thus obtain improved memory access efficiency even with concurrent accesses to disparate data items.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A central processing unit coupled to a main memory unit, said central processing unit having a data cache and an uncached load/store unit, wherein the data cache is responsive to a first class of cached load and store instructions, and the uncached load/store unit is responsive to a second distinct class of uncached load and store instructions, and the uncached load/store unit comprises:

a multi-word buffer;

buffer control logic coupled to said multi-word buffer;

data steering logic coupled to said multi-word buffer, whereby a specific data unit within the buffer may be transferred to the central processing unit, or whereby data may be transferred from the central processing unit to a specific word within the buffer;

instruction decode logic for the uncached load and store instructions, coupled to said buffer control logic, said data steering logic, and said instruction register of said central processing unit;

a buffer tag register holding the main memory address of a first word of a data unit stored in said multi-word buffer, if any;

address bus means whereby the main memory address of the data unit referenced by the uncached load or store instructions may be computed and transferred to the uncached load/store unit by said central processing unit;

a tag comparator coupled to the buffer control logic, the buffer tag register and the address bus means for comparing the contents of the buffer tag register to the memory address computed by the central processing unit;

memory access means whereby one or more words may be transferred from the multi-word buffer to main memory in a burst manner, or whereby one or more words may be transferred from main memory to the multi-word buffer in a burst manner; and a set of word-valid flags, each of which indicates whether a corresponding data word in the buffer contains valid data or not, said word-valid flags being individually set responsive to data words being written into the corresponding locations in the buffer, and said word-valid flags being individually cleared responsive to data words being transferred from the buffer to main memory, and said word-valid flags being collectively cleared responsive to hit-testing and flushing operations performed by said buffer control unit.

2. The apparatus of claim 1, wherein said buffer control unit is responsive to a prefetch bit within said instruction register for prefetching data from main memory comprising the steps of:

fetching a first data unit requested in accordance with the uncached load instruction and returning said data unit to the central processing unit, and concomitantly writing said data unit to the multi-word buffer and setting the corresponding word-valid flag;

fetching at least one additional data unit successive to the said first data unit and writing said additional data unit into the multi-word buffer and setting the corresponding word-valid flag;

detecting by means of said tag comparator and said word-valid flags whether further uncached load instructions reference data already present in the multi-word buffer, and, if so, returning the data units corresponding to said further uncached load units directly to the central processing unit without performing any main memory accesses.

3. The apparatus of claim 2, wherein said buffer control unit further detects by means of said tag comparator when an uncached load instruction references a memory word that has not yet been fetched from main memory by a prefetch operation in progress, but will be fetched in the course of completing said prefetch operation, and said buffer control unit does not interrupt the prefetch but instead waits until the requested data unit has been prefetched and then returns said data unit to the central processing unit.

4. The apparatus of claim 3, wherein said buffer control unit further detects by means of said tag comparator when an uncached load instruction references a memory word that will not be fetched from main memory by a prefetch operation in progress, and is also not already present in the buffer, and said buffer control unit halts the prefetch operation in progress before said prefetch operation completes.

5. A method of accessing memory using the apparatus of claim 2, comprising the steps of:

categorizing memory accesses as being one of a first type for which cached access is desirable and a second type for which cached access is undesirable, wherein said second type of access is one in which at least one of the following conditions is true: 1) data to be accessed by said central processing unit from said main memory is also to be accessed by an external entity from said main memory; 2) data to be accessed by said central processing unit from said main memory is to be referenced infrequently;

including within a program for the central processing unit both cached load/store instructions corresponding to the first type of memory access, and uncached load/store instructions corresponding to the second type of memory access;

during program execution, the data cache executing cached load/store instructions and the uncached load/store unit executing uncached load/store instructions.

6. The method of claim 5, wherein said categorizing is performed by a programmer, the method comprising the further steps of:

the programmer setting a prefetch bit within a first uncached load instruction that references the first of a group of data units to be fetched from the main memory for which it is advantageous, with respect to the reduction of memory bandwidth and the reduction of program execution time, to prefetch all or part of said group of data units into the uncached load unit in a burst manner;

the uncached load/store unit, when executing the uncached load instruction, fetching the said first data unit requested in accordance with said first uncached load instruction and, concomitantly, prefetching at least one additional data unit, in a burst manner.

7. The apparatus of claim 1, said uncached load/store unit further comprising a dirty flag register indicating whether the buffer holds information from a preceding uncached store instruction that has not yet been written back to main memory.

8. The apparatus of claim 7, wherein said buffer control unit is responsive to a buffer bit within said instruction register for performing a gather operation, comprising the steps of:

writing a data unit to be stored, in accordance with a first uncached store instruction having its buffer bit set, into the multi-word buffer, and setting the said dirty flag and the corresponding word-valid flag, but not transferring said data unit to memory;

writing zero or more additional data units to be stored into the multi-word buffer in accordance with zero or more further uncached store instructions having their buffer bits set, and setting zero or more additional corresponding word-valid flags, but not transferring said data units to memory;

writing a data unit to be stored, in accordance with a final uncached store instruction having its buffer bit cleared, into the multi-word buffer, and then storing all data units written by said first, additional and final uncached store instructions to the main memory in a burst manner, finally clearing said dirty and word-valid flags.

9. The apparatus of claim 8, wherein said buffer control unit further comprises means for detecting when an uncached load instruction is to be executed concomitantly with one or more data units present in said multi-word buffer, with said dirty flag being set, and wherein said buffer control unit first flushes the contents of said multi-word buffer to the main memory in a burst manner prior to executing said uncached load instruction.

10. The apparatus of claim 8, wherein said uncached load/store unit is responsive to buffer flush instructions executed by the central processing unit to cause the contents of said multi-word buffer, with said dirty flag being set, to be flushed to the corresponding locations in the main memory.

11. A method of accessing memory using the apparatus of claim 8, comprising the steps of:

categorizing memory accesses as being one of a first type for which cached access is desirable and a second type for which cached access is undesirable, wherein said second type of access is one in which at least one of the following conditions is true: 1) data to be accessed by said central processing unit from said main memory is also to be accessed by an external entity from said main memory; 2) data to be accessed by said central processing unit from said main memory is to be referenced infrequently;

including within a program for the central processing unit both cached load/store instructions corresponding to the first type of memory access, and uncached load/ store instructions corresponding to the second type of memory access;

during program execution, the data cache executing cached load/store instructions and the uncached load/ store unit executing uncached load/store instructions.

12. The method of claim 11, wherein said categorizing is performed by a programmer, the method comprising the further steps of:

the programmer setting a buffer bit within a first uncached store instruction that references the first data unit of a group of data units to be written to the main memory for which it is advantageous, with respect to the reduction of memory bandwidth and the reduction of program execution time, to write the group of data units to the main memory in a burst manner;

the uncached load/store unit, when executing said first uncached store instruction, writing said first data unit into said multi-word buffer without transferring said first data unit to memory;

the programmer setting the buffer bits within further uncached store instructions that reference the remaining data units of said group of data units, excepting the last data unit in said group, thereby causing the uncached load/store unit, when executing said further uncached store instructions, to accumulate said remaining data units within said multi-word buffer;

the programmer clearing the buffer bit within the last uncached store instruction that references said last data unit in said group, thereby causing the uncached load/ store unit, when executing said last uncached store instruction, to transfer all the data units of said group to the main memory in a burst manner.

* * * * *